(12) United States Patent
Seo et al.

(10) Patent No.: US 12,135,493 B2
(45) Date of Patent: Nov. 5, 2024

(54) CAMERA MODULE

(71) Applicant: LG INNOTEK CO., LTD., Seoul (KR)

(72) Inventors: In Jun Seo, Seoul (KR); Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/909,713

(22) PCT Filed: Mar. 4, 2021

(86) PCT No.: PCT/KR2021/002675
§ 371 (c)(1),
(2) Date: Sep. 6, 2022

(87) PCT Pub. No.: WO2021/177743
PCT Pub. Date: Sep. 10, 2021

(65) Prior Publication Data
US 2024/0210795 A1    Jun. 27, 2024

(30) Foreign Application Priority Data

Mar. 6, 2020    (KR) .......................... 10-2020-0028344

(51) Int. Cl.
*G03B 15/06*        (2021.01)
*G01S 7/481*        (2006.01)
(Continued)

(52) U.S. Cl.
CPC ............ *G03B 15/06* (2013.01); *G01S 7/4815* (2013.01); *G01S 7/4817* (2013.01); *G01S 17/894* (2020.01);
(Continued)

(58) Field of Classification Search
CPC ..... G03B 15/06; G01S 7/4815; G01S 7/4817; G01S 17/894; G02B 26/0833; H04N 23/55; H04N 23/56
See application file for complete search history.

(56) References Cited

U.S. PATENT DOCUMENTS 9,826,216 B1 *  11/2017  Hazeghi ............. G02B 26/0808
2014/0168630 A1   6/2014  Iida et al.
(Continued)

FOREIGN PATENT DOCUMENTS

| KR | 10-1521356 B1 | 5/2015 |
| KR | 10-1538395 B1 | 7/2015 |

(Continued)

*Primary Examiner* — Shahbaz Nazrul
(74) *Attorney, Agent, or Firm* — Birch, Stewart, Kolasch & Birch, LLP

(57) ABSTRACT

A camera module disclosed in the embodiment includes a light emitting portion and an image sensor, wherein the light emitting portion includes a light source, a first lens portion disposed on the light source, a reflective member reflecting light emitted from the light source, and a driving member for moving the first lens portion between the light source and the reflective member, wherein the reflective member includes a plurality of mirrors, and the plurality of mirrors may be arranged to be tiltable within a predetermined angle range from a reference angle.

20 Claims, 11 Drawing Sheets

(51) Int. Cl.
*G01S 17/894* (2020.01)
*G02B 26/08* (2006.01)
*H04N 23/55* (2023.01)
*H04N 23/56* (2023.01)

(52) U.S. Cl.
CPC ......... *G02B 26/0833* (2013.01); *H04N 23/55* (2023.01); *H04N 23/56* (2023.01)

(56) References Cited

U.S. PATENT DOCUMENTS

| | | | |
|---|---|---|---|
| 2015/0229912 A1* | 8/2015 | Masalkar | H04N 13/254 |
| | | | 348/46 |
| 2019/0011809 A1 | 1/2019 | Wippermann et al. | |
| 2019/0102043 A1 | 4/2019 | Lee | |
| 2019/0313007 A1 | 10/2019 | Kim | |
| 2020/0003870 A1* | 1/2020 | Chen | G01S 7/4813 |
| 2020/0244854 A1 | 7/2020 | Lee et al. | |
| 2021/0099618 A1 | 4/2021 | O | |
| 2021/0109199 A1* | 4/2021 | Hennecke | G01S 17/10 |

FOREIGN PATENT DOCUMENTS

| | | | |
|---|---|---|---|
| KR | 10-2017-0131044 A | 11/2017 | |
| KR | 10-2019-0017113 A | 2/2019 | |
| KR | 10-2019-0110231 A | 9/2019 | |
| KR | 10-2019-0117176 A | 10/2019 | |
| KR | 10-2020-0012611 A | 2/2020 | |

\* cited by examiner

CAMERA MODULE

CROSS REFERENCE TO RELATED APPLICATIONS

This application is the National Phase of PCT International Application No. PCT/KR2021/002675, filed on Mar. 4, 2021, which claims priority under 35 U.S.C. 119 (a) to Patent Application No. 10-2020-0028344, filed in the Republic of Korea on Mar. 6, 2020, all of which are hereby expressly incorporated by reference into the present application.

TECHNICAL FIELD

The embodiment relates a camera module.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions.

For example, the camera module may perform an autofocus (AF) function of aligning the focal lengths of the lenses by automatically adjusting the distance between the image sensor and the lens, and may perform a zooming function of zooming up or zooming out by increasing or decreasing the magnification of a distant object through a zoom lens. In addition, the camera module employs image stabilization (IS) technology to correct or prevent image stabilization due to camera movement caused by an unstable fixing device or a user's movement.

In addition, in recent years, the demand and supply of 3D content is increasing. Accordingly, various technologies capable of grasping depth information are being researched and developed for the realization of 3D content. For example, a technology that can determine depth information includes a technology using a stereo camera, a technology using a structured light camera, a technology using a depth from defocus (DFD) camera, and a time of flight (TOF) camera modules.

First, a technology using a stereo camera is a technology of generating depth information using a difference in distance, spacing, etc. generated from a left and right parallax of an image received through a plurality of cameras, for example, each camera disposed on the left and right sides.

In addition, a technology using a structured light camera is a technology that generates depth information using a light source arranged to form a set pattern, and a technology using a DFD (Depth from defocus) camera is a technology using blurring of focus and is a technology for generating depth information using a plurality of images having different focal points taken in the same scene.

In addition, a time of flight (TOF) camera is a technology for generating depth information by measuring the time it takes for light emitted from a light source toward an object to be reflected by the object and return to a sensor, and calculating a distance from the object. Such a TOF camera has recently attracted attention because it has the advantage of acquiring depth information in real time.

However, the TOF camera has a safety problem by using light of a relatively high wavelength band. In detail, the light used in the TOF camera generally uses light in an infrared wavelength band, and when the light is incident on a sensitive part of a person, for example, the eyes, skin, etc., there is a problem that may cause various injuries and diseases.

In addition, the light emitting portion of the TOF camera emits light of the same luminous intensity and size regardless of the size of the object located in front of the camera, the distance from the object, and the like, and emits light limited to a field of illumination (FOI) or a specific location. Accordingly, there is a problem in that the light does not reach the FOI or a specific position, or the light of low intensity arrives, so that the accuracy of the depth information is reduced. That is, there is a problem in that spatial resolution characteristics are low.

Therefore, a new camera module capable of solving the above problems is required.

DISCLOSURE

Technical Problem

An embodiment is to provide a camera module capable of acquiring depth information about an object in real time.

In addition, the embodiment intends to provide a camera module capable of improving the accuracy of depth information on an object.

In addition, the embodiment intends to provide a camera module capable of effectively acquiring depth information of an object located at a long distance.

In addition, an embodiment is to provide a camera module capable of simultaneously acquiring depth information of a plurality of objects.

In addition, the embodiment is intended to provide a camera module capable of reducing the thickness and volume.

Technical Solution

A camera module according to an embodiment includes a light emitting portion and an image sensor, wherein the light emitting portion includes a light source, a first lens portion disposed on the light source, a reflective member reflecting light emitted from the light source, and a driving member for moving the first lens portion between the light source and the reflective member, wherein the reflective member includes a plurality of mirrors, and the plurality of mirrors may be arranged to be tiltable within a predetermined angle range from a reference angle.

In addition, when an object is selected, at least one of a mirror corresponding to the object and a mirror corresponding to a peripheral portion of the object may be tilted within the predetermined angle range from the reference angle.

In addition, a mirror that does not correspond to the object among the plurality of mirrors may be disposed while maintaining the reference angle.

In addition, the plurality of mirrors may include at least one of a reflective micro-electric mechanical system (MEMS) mirror, a transmissive MEMS mirror, a reflective digital micromirror device (DMD) device, and a transmissive DMD device.

In addition, the plurality of mirrors may be disposed to be inclined at the reference angle with respect to the optical axis of the light source, and the reference angle may be 45 degrees.

Further, the light source includes a vertical cavity surface emitting laser, the vertical cavity surface emitting laser includes a plurality of apertures, and the plurality of mirrors may be provided in a number greater than or equal to the number of the plurality of apertures.

Also, the first lens portion may move along an optical axis of the light source by the driving member.

Also, the first lens portion may move in a direction perpendicular to the optical axis of the light source by the driving member.

In addition, the driving member may adjust a light pattern irradiated to the object as a surface light source or a point light source.

The light receiving portion may include a light receiving portion including the image sensor, and the light receiving portion may include a second lens portion disposed on the image sensor.

In addition, the camera module according to the embodiment includes a light emitting portion and an image sensor, the light emitting portion includes a light source, a reflective member disposed on the light source and reflecting light emitted from the light source, wherein the light source is a vertical cavity surface an emitting laser, wherein the vertical cavity surface emitting laser includes a plurality of apertures, the reflective member includes a plurality of mirrors, the plurality of mirrors is greater than or equal to the number of the plurality of apertures, and the plurality of mirrors may be arranged to be tiltable within a predetermined angle range from a reference angle.

Advantageous Effects

The camera module according to the embodiment may acquire depth information about an object in real time and may acquire depth information with improved accuracy. In detail, the camera module may include a reflective member disposed between the light source and the light receiving portion, and the reflective member may include a plurality of mirrors. In this case, the plurality of mirrors may be tilted at a predetermined angle by the control portion, thereby concentrating more light on the object. Accordingly, the camera module may improve the accuracy of depth information on the object.

Also, the camera module according to the embodiment may effectively acquire depth information of an object located at a long distance. In detail, the camera module may control a mirror corresponding to the object and a mirror corresponding to a peripheral portion of the object among a plurality of mirrors. Accordingly, more light may be focused on the object located at a long distance, so that depth information with improved accuracy may be obtained.

In addition, the camera module according to the embodiment may track the object. In detail, when the position of the camera module is changed due to movement of the object, the camera module may control a corresponding mirror. Accordingly, accurate depth information may be acquired in real time even when the position of the object is changed.

Also, the camera module according to the embodiment may acquire depth information of a plurality of objects located at different positions. In detail, the camera module may control mirrors corresponding to the plurality of objects, respectively, and mirrors corresponding to peripheral portions of the plurality of objects. Accordingly, depth information on the plurality of objects may be simultaneously acquired, and depth information with improved accuracy may be acquired.

Also, the light emitting portion of the camera module according to the embodiment may extend in a direction different from that of the light receiving portion. In detail, the optical axis of the light emitting portion may be disposed in a shape perpendicular to the optical axis of the light receiving portion. Accordingly, the camera module may have a smaller thickness and a smaller volume.

[Best Mode]

Figure 1:
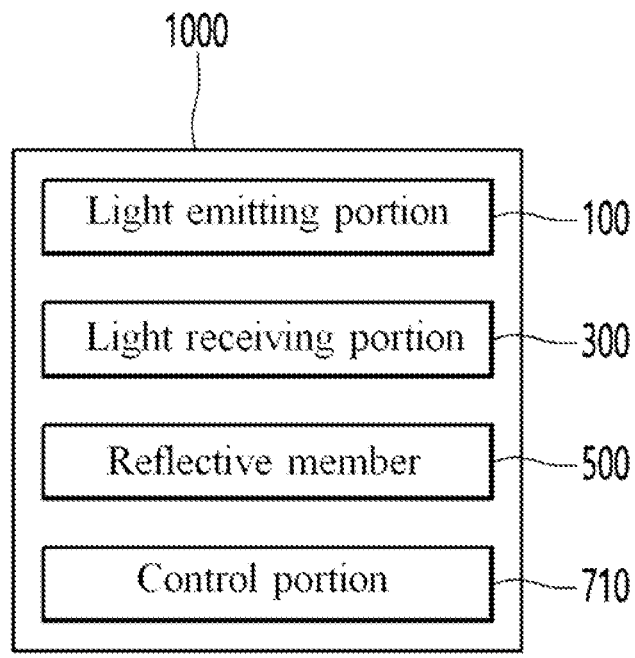
FIG. 1 is a configuration diagram of a camera module according to an embodiment.

Hereinafter, preferred embodiments of the present invention will be described in detail with reference to the accompanying drawings.

However, the technical spirit of the invention is not limited to some embodiments to be described, and may be implemented in various other forms, and one or more of the components may be selectively combined and substituted for use within the scope of the technical spirit of the invention.

In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C.

In addition, in describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component.

In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In addition, before the description of the embodiment of the invention, the first direction may mean the x-axis direction shown in the drawings, the second direction may be a different direction from the first direction. For example, the second direction may mean a y-axis direction shown in the drawing in a direction perpendicular to the first direction. Also, the transverse direction may mean first and second directions, and the vertical direction may mean a direction perpendicular to at least one of the first and second directions. For example, the transverse direction may refer to the x-axis and y-axis directions of the drawing, and the vertical direction may be a z-axis direction of the drawing and a direction perpendicular to the x-axis and y-axis directions.

Figure 2:
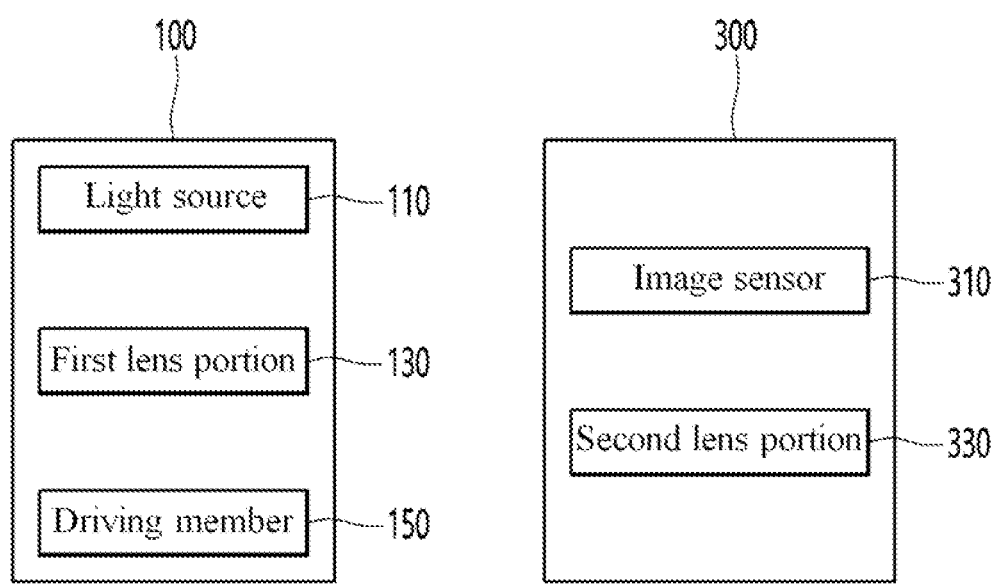
FIG. 2 is a configuration diagram of a light emitting portion and a light receiving portion in the camera module according to the embodiment.
Figure 3:
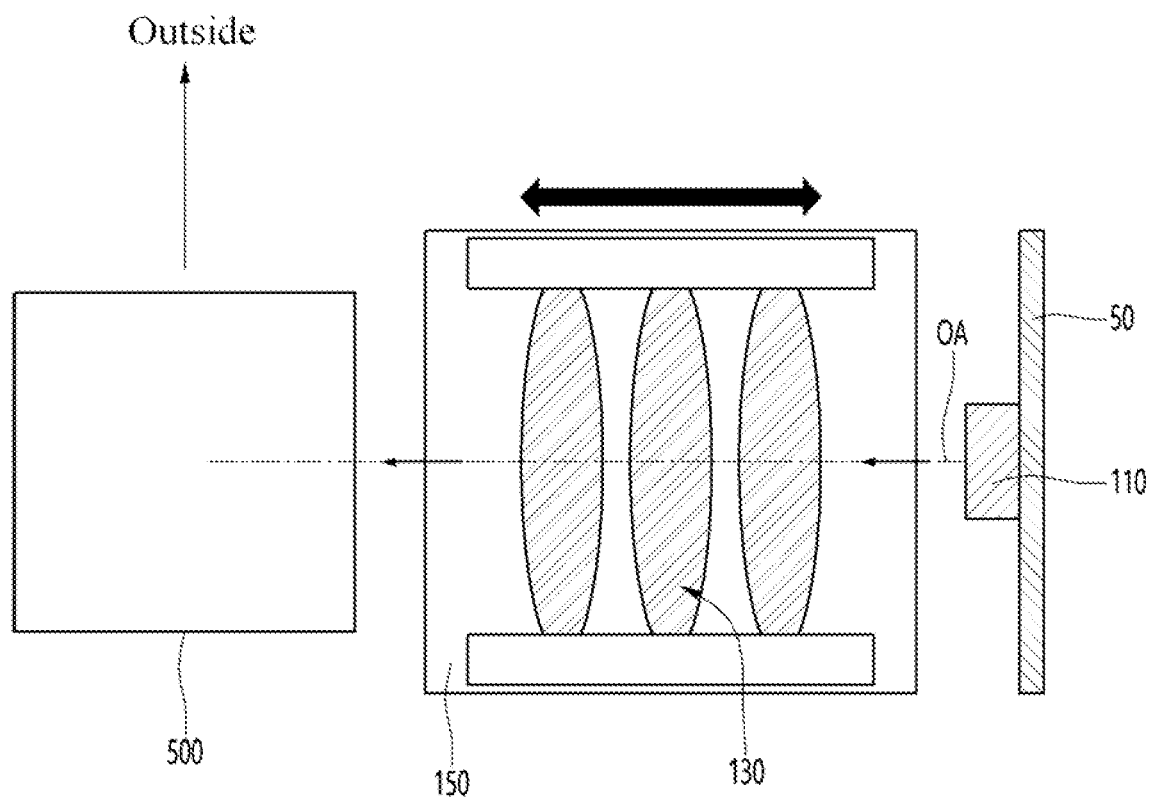
FIG. 3 is a view illustrating an arrangement of a light emitting portion and a reflective member in the camera module according to the embodiment.
Figure 4:
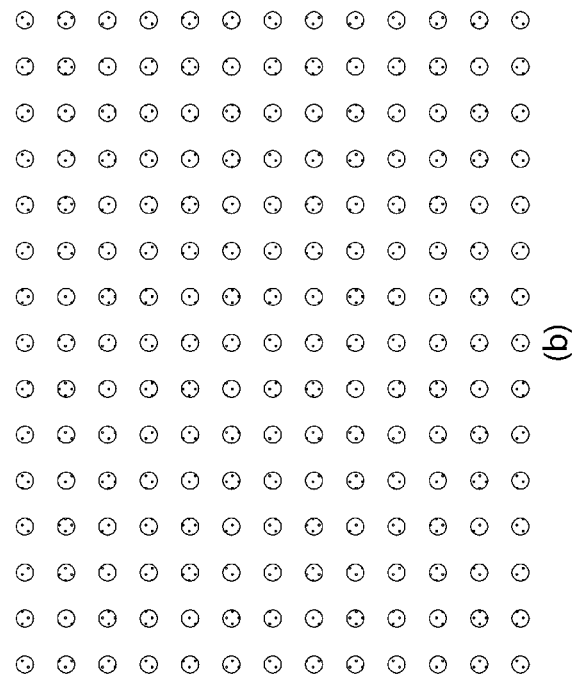
FIG. 4 is a view for explaining a light pattern of a camera module according to an embodiment.
Figure 4:
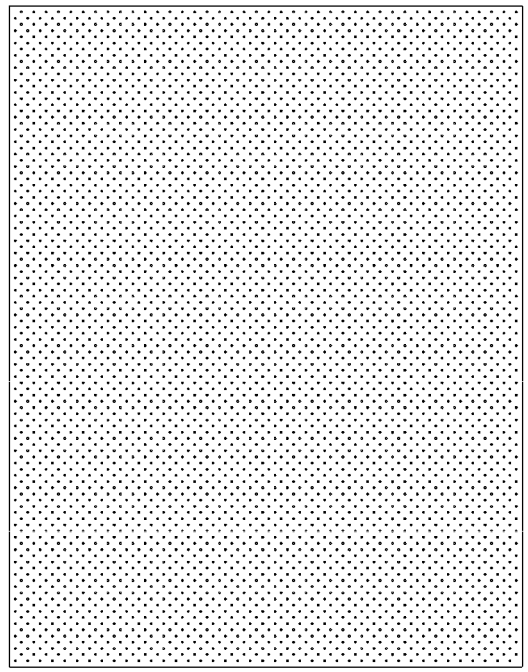
Figure 5:
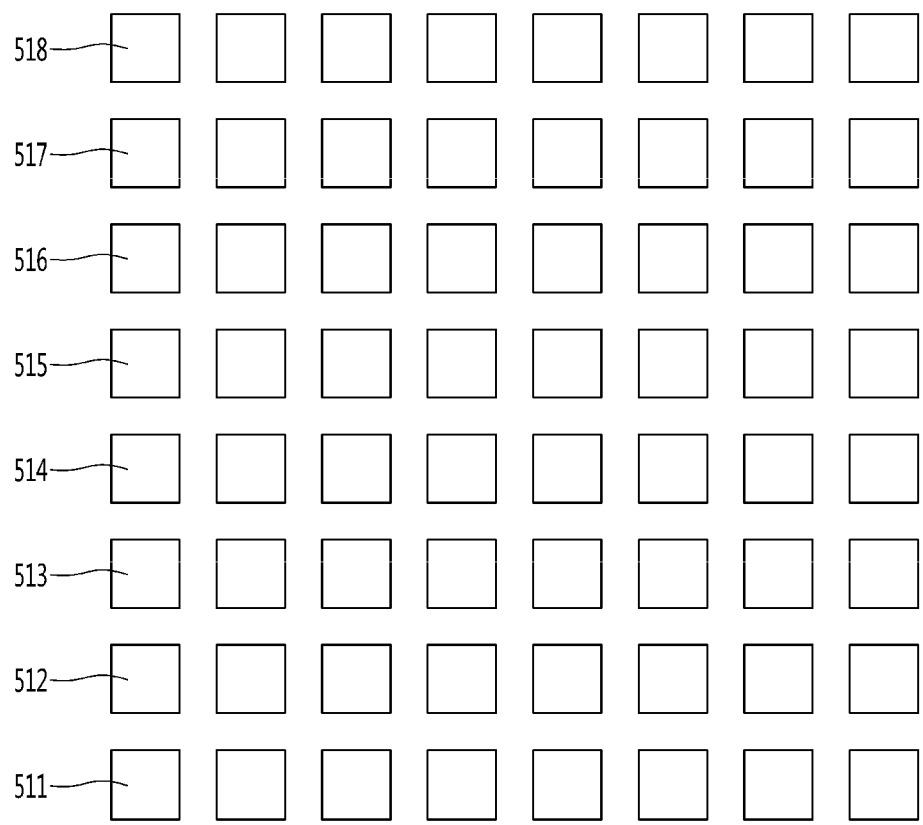
FIG. 5 is a front view of a reflective member according to an embodiment.

FIG. 1 is a configuration diagram of a camera module according to an embodiment, and FIG. 2 is a configuration diagram of a light emitting portion and a light receiving portion in the camera module according to the embodiment. In addition, FIG. 3 is a view illustrating an arrangement of a light emitting portion and a reflective member in the camera module according to the embodiment, and FIG. 4 is a view for explaining a light pattern of the camera module according to the embodiment. In addition, FIG. 5 is a front view of the reflective member according to the embodiment.

First, referring to FIG. 1, in a camera module 1000 according to an embodiment, the camera module 1000 may include a light emitting portion 100, a light receiving portion 300, a reflective member 500, and a control portion 710.

The light emitting portion 100 may emit light. The light emitting portion 100 may emit light of a set intensity. The light emitting portion 100 may emit light of a wavelength band set in a set direction. For example, the light emitting portion 100 may emit light in a visible or infrared wavelength band. The light emitting portion 100 may emit infrared light in a wavelength band of about 700 nm to about 1 mm. The light emitting portion 100 may emit light in a front direction of the light emitting portion 100. For example, the light emitting portion 100 may emit light toward an object located in the light emission direction.

The light receiving portion 300 may receive light. The light receiving portion 300 may detect the light reflected by the object. The light receiving portion 300 may detect the light emitted from the light emitting portion 100. The light receiving portion 300 may detect light of a wavelength band corresponding to the light emitted by the light emitting portion 100. In detail, the light receiving portion 300 may detect light emitted from the light emitting portion 100 and reflected on the object.

That is, the camera module 1000 may be a time of flight (TOF) camera that emits light toward an object and calculates depth information of an object based on light information reflected back by the object.

The reflective member 500 may be disposed on the light emitting portion 100. The reflective member 500 may be disposed between the light emitting portion 100 and the light receiving portion 300. In detail, the reflective member 500 may be disposed between the light emitting portion 100 and the object.

For example, the reflective member 500 may be disposed in the light emitting portion 100. In this case, the reflective member 500 may be disposed between the light source 110 of the light emitting portion 100 and the object. Alternatively, the reflective member 500 may be disposed on the light emitting portion 100 and spaced apart from the light emitting portion 100. The reflective member 500 may reflect the light emitted from the light emitting portion 100 at a set angle. The reflective member 500 will be described in more detail with reference to drawings to be described later.

The control portion 710 may be connected to at least one of the light emitting portion 100 and the light receiving portion 300. The control portion 710 may control driving of at least one of the light emitting portion 100 and the light receiving portion 300. Also, the control portion 710 may be connected to the reflective member 500 to control the driving of the reflective member 500. For example, the control portion 710 may control the tilt angles of the plurality of mirrors 510 included in the reflective member 500 according to the size, position, and shape of the object.

The camera module 1000 may further include a coupling portion (not shown) and a connection portion (not shown).

The coupling portion may be connected to an optical device to be described later. The coupling portion may include a circuit board and a terminal disposed on the circuit board. For example, the terminal may be a connector for physical and electrical connection with the optical device.

The connection portion may be disposed between the substrate 50 and the coupling portion of the camera module 1000, which will be described later. The connection portion may connect the substrate 50 and the coupling portion. For example, the connection portion may include a flexible PCB (FBCB), and may electrically connect the substrate 50 and the circuit board of the coupling portion. Here, the substrate 50 may be at least one of a first substrate 50a and a second substrate 50b, which will be described later.

The light emitting portion 100 and the light receiving portion 300 according to the embodiment will be described in more detail with reference to FIGS. 2 to 5.

Referring to FIGS. 2 to 5, the light emitting portion 100 is disposed on a first substrate 50a and may include a light source 110 and a first lens portion 130.

The first substrate 50a may support the light emitting part 100. The first substrate 50a may be electrically connected to the light emitting part 100. The first substrate 50a may be a circuit board. The first substrate 50a may include a wiring layer for supplying power to the light emitting portion 100, and may be a printed circuit board (PCB) formed of a plurality of resin layers. For example, the first substrate 50a may include at least one of a rigid PCB, a metal core PCB (MCPCB), a flexible PCB (FPCB), and a Rigid Flexible PCB (RFPCB).

In addition, the first substrate 50a may include a synthetic resin including glass, resin, epoxy, or the like, and may include a ceramic having excellent thermal conductivity and a metal having an insulated surface. The first substrate 50a may have a shape such as a plate or a lead frame, but is not limited thereto. In addition, although not shown in the drawings, a Zener diode, a voltage regulator, and a resistor may be further disposed on the first substrate 50a, but the present disclosure is not limited thereto.

An insulating layer (not shown) or a protective layer (not shown) may be disposed on the first substrate 50a. The insulating layer or the protective layer may be disposed on at least one of one surface and the other surface of the first substrate 50a.

The light source 110 may be disposed on the first substrate 50a. The light source 110 may be in direct contact with the upper surface of the first substrate 50a and may be electrically connected to the first substrate 50a.

The light source 110 may include a light emitting device. For example, the light source 110 may include at least one light emitting device among a light emitting diode (LED), a vertical cavity surface emitting laser (VCSEL), an organic light emitting diode (OLED), and a laser diode (LD).

The light source 110 may include one or a plurality of light emitting devices. For example, when a plurality of light emitting devices are disposed on the first substrate 50a, the plurality of light emitting devices may be disposed along a pattern set on the first substrate 50a. In detail, the plurality of light emitting devices may be arranged such that a region from which light is emitted from the plurality of light emitting devices, for example, at least one aperture for light emission has a predetermined rule. Accordingly, the light source 110 may emit light of a set intensity in a set direction.

The light source 110 may emit light of a set wavelength band. In detail, the light source 110 may emit visible light or infrared light. For example, the light source 110 may emit visible light in a wavelength band of about 380 nm to about 700 nm. In addition, the light source 110 may emit infrared light in a wavelength band of about 700 nm to about 1 mm.

A first lens portion 130 may be disposed on the light source 110. The first lens portion 130 is spaced apart from the light source 110 and may include at least one lens and a housing accommodating the lens. The lens may include at least one of glass and plastic.

The first lens portion 130 may be disposed on an emission path of the light emitted from the light source 110. The first lens portion 130 may be disposed on a region corresponding to the light source 110. In detail, the first lens portion 130 may be disposed in a region whose center overlaps the optical axis OA of the light source 110.

The first lens portion 130 may control a path of the light emitted from the light source 110. For example, the first lens portion 130 may condense, diffuse, and scatter the light emitted from the light source 110.

The first lens portion 130 may transform the light emitted from the light source 110 into a set shape. For example, the first lens portion 130 may transform the light emitted from the light source 110 into various cross-sectional shapes, such as a circular shape, an elliptical shape, and a polygonal shape. Also, the first lens portion 130 may transform the light emitted from the light source 110 into a plurality of point light sources. The first lens portion 130 may transform the light emitted from the light source 110 into a shape corresponding to the effective region of the image sensor 310 of the light receiving portion 300.

The first lens portion 130 may prevent the light emitted from the light source 110 from being directly irradiated onto the object. For example, the first lens portion 130 may control the light emitted from the light source 110 to prevent the light from being directly irradiated to a light-sensitive region, such as a human eye or skin.

In addition, the first lens portion 130 may improve the luminance uniformity of the light emitted from the light source 110. In addition, the first lens portion 130 may prevent the formation of a hot spot where light is concentrated in a region where the light emitting device of the light source 110 is disposed, for example, in a region corresponding to the aperture of the light emitting device.

The light emitting portion 100 may further include a driving member 150. The driving member 150 may be disposed on the first lens portion 130. The driving member 150 may be coupled to the first lens portion 130. For example, the driving member 150 may be coupled to the housing of the first lens portion 130. Also, the driving member 150 may be coupled to at least one lens of the first lens portion 130.

The driving member 150 may move the first lens portion 130. The driving member 150 may include at least one actuator.

Referring to FIG. 3, the first lens portion 130 may be disposed between the light source 110 and the reflective member 500. In this case, the driving member 150 may control the distance between the first lens portion 130 and the light source 110. For example, the driving member 150 may move the first lens portion 130 between the light source 110 and the reflective member 500. The driving member 150 may move the first lens portion 130 along the optical axis OA of the light source 110. Accordingly, the distance between the first lens portion 130 and the light source 110 may increase or decrease.

Also, the driving member 150 may move at least one lens of the first lens portion 130 along the optical axis OA of the light source 110. In this case, the distance between the light source 110 and one lens closest to the light source 110 may vary. Also, when the first lens portion 130 includes a plurality of lenses, the distance between the one lens and the other lens may also change.

That is, the driving member 150 may control the position of the first lens portion 130. Accordingly, the path of the light emitted from the light source 110 may be changed. In detail, the driving member 150 may drive so that the distance between the light source 110 and the first lens portion 130 is close, so that the light emitted from the camera module 1000 forms a surface light source. Also, the driving member 150 may drive the light source 110 and the first lens portion 130 to be spaced apart so that the light emitted from the camera module 1000 forms a point light source. Here, the surface light source may mean a light source that is uniformly irradiated to the region set as shown in FIG. 4(a), and the point light source may mean a light source that is irradiated in a dot shape to the region set as shown in FIG. 4(b).

Although not shown in the drawings, the driving member 150 may be omitted. For example, the light emitting portion 100 may form one light source selected from a point light source and a surface light source. In this case, the light source 110 and the first lens portion 130 may be fixed at a set interval to form a point light source or a surface light source, and movement of the first lens portion 130 may be unnecessary.

The light receiving portion 300 is disposed on the second substrate 50b and may include an image sensor 310 and a second lens portion 330.

The second substrate 50b may support the light receiving portion 300. The second substrate 50b may be electrically connected to the light receiving portion 300. The second substrate 50b may be a circuit board. The second substrate 50b may include a wiring layer for supplying power to the light emitting portion 100 and may be a printed circuit board (PCB) formed of a plurality of resin layers. For example, the second substrate 50b may include at least one of a rigid PCB, a metal core PCB (MCPCB), a flexible PCB (FPCB), and a Rigid Flexible PCB (RFPCB).

In addition, the second substrate 50b may include a synthetic resin including glass, resin, epoxy, or the like, and may include a ceramic having excellent thermal conductivity and a metal having an insulated surface. The second substrate 50b may have a shape such as a plate or a lead frame, but is not limited thereto. In addition, although not shown in the drawings, a Zener diode, a voltage regulator, a resistor, etc. may be further disposed on the second substrate 50b, but the present invention is not limited thereto.

An insulating layer (not shown) or a protective layer (not shown) may be disposed on the second substrate 50b. The insulating layer or the protective layer may be disposed on at least one of one surface and the other surface of the second substrate 50b.

The second substrate 50b may be electrically connected to the first substrate 50a. The second substrate 50b may be separated from the first substrate 50a, or may be formed integrally, but is not limited thereto.

The image sensor 310 may be disposed on the second substrate 50b. The image sensor 310 may directly contact the upper surface of the second substrate 50b and may be electrically connected to the second substrate 50b. The image sensor 310 may be electrically connected to the second substrate 50b.

The image sensor 310 may sense light. The image sensor 310 may detect light reflected by an object and incident on the camera module 1000. The image sensor 310 may detect light having a wavelength corresponding to the light emitted from the light source 110. The image sensor 310 may detect light incident through a second lens portion 330 to be described later. The image sensor 310 may detect light emitted from the light source 110 and reflected on the object to detect depth information of the object.

The image sensor 310 may be disposed in a direction different from that of the light source 110. For example, the optical axis of the image sensor 310 and the optical axis OA of the light source 110 may be in different directions. In detail, the optical axis of the image sensor 310 and the optical axis OA of the light source 110 may be perpendicular.

The second lens portion 330 may be disposed on the image sensor 310. The second lens portion 330 is spaced apart from the image sensor 310 and may include at least one lens and a housing accommodating the lens. The lens may include at least one of glass and plastic.

The second lens portion 330 may be disposed on a light path incident to the light receiving portion 300. The second lens portion 330 may transmit light emitted from the light source 110 and reflected on the object in the direction of the image sensor 310. To this end, the optical axis of the second lens portion 330 may correspond to the optical axis of the image sensor 310.

The light receiving portion 300 may include a filter (not shown). The filter may be disposed between the object and the image sensor 310. For example, the filter may be disposed between the image sensor 310 and the second lens portion 330.

The filter may pass light of a set wavelength band and filter light of a different wavelength band. In detail, the filter may pass light having a wavelength corresponding to that of the light source 110 among the light incident on the light receiving portion 300 through the second lens portion 330 and may block light having a wavelength band different from that of the light source 110.

Referring to FIGS. 3 and 5, a reflective member 500 may be disposed on the light emitting portion 100. The reflective member 500 may be disposed on the first lens portion 130. The reflective member 500 may be disposed in a region corresponding to the optical axis OA of the light source 110. The reflective member 500 may be disposed side by side with the light source 110 and the first lens portion 130. The first lens portion 130 may be disposed between the light source 110 and the reflective member 500. The reflective member 500 may reflect the light passing through the first lens portion 130 toward the object.

The reflective member 500 may include a plurality of mirrors 510. The plurality of mirrors 510 may be disposed in a region corresponding to the light source 110. In detail, the centers of the plurality of mirrors 510 may overlap the optical axis OA of the light source 110. In addition, the plurality of mirrors 510 may be disposed in a region corresponding to the light emitting device of the light source 110. For example, the plurality of mirrors 510 may be disposed in a region corresponding to the light emitting device disposed in a set pattern. In detail, the plurality of mirrors 510 may be disposed in a region corresponding to the aperture of the light emitting device.

The plurality of mirrors 510 may include at least one of a micro-electric mechanical system (MEMS) mirror and a digital micromirror device (DMD) device. For example, the plurality of mirrors 510 may include at least one of a reflective MEMS mirror, a transmissive MEMS mirror, a reflective DMD device, and a transmissive DMD device. In addition, the plurality of mirrors 510 may include at least one of a transflective MEMS mirror and a transflective DMD device.

The plurality of mirrors 510 may have shapes corresponding to each other. In detail, the plurality of mirrors 510 may have various shapes such as a circle, a circular shape, a triangle, and a square, and may have the same shape and size as each other. For example, the plurality of mirrors 510 may be provided in a rectangular shape as shown in FIG. 5.

The plurality of mirrors 510 may be spaced apart from each other. For example, when the light emitting devices are spaced apart in the transverse and longitudinal directions, the plurality of mirrors may be spaced apart in the transverse and longitudinal directions as shown in FIG. 5. In this case, one mirror among the plurality of mirrors 510 may be disposed at equal intervals to an adjacent mirror. For example, one mirror and a mirror adjacent to each other in the transverse direction may be disposed at equal intervals to each other. In addition, one mirror and the mirrors adjacent to each other in the longitudinal direction may be disposed at equal intervals from each other. Also, the distance between one mirror and the mirrors adjacent in the transverse direction may be the same as the distance between the mirrors adjacent in the longitudinal direction.

The plurality of mirrors 510 may have a number corresponding to that of the light source 110. For example, the plurality of mirrors 510 may be provided in a number equal to or greater than the plurality of apertures of the light emitting device. In detail, when the plurality of mirrors 510 have the same number of apertures as the apertures of the light emitting device, the plurality of mirrors 510 may effectively control the path of light emitted from each aperture. In addition, when the number of the plurality of mirrors 510 is greater than the number of the apertures, the path of light emitted from the apertures may be controlled in more detail. Accordingly, the camera module 1000 may have improved resolution.

For example, as shown in FIG. 5, the plurality of mirrors 510 may include first to eighth mirrors 511, 512, 513, 514, 515, 516, 517, and 518 based on the leftmost column. In this case, the first mirror 511 may be a lowermost mirror, and the eighth mirror 518 may be an uppermost mirror. For convenience of explanation, in the specification and drawings, the mirror 510 is expressed as that a total of 64 mirrors 510 are arranged in 8 transverse lines and 8 longitudinal lines, but the embodiment is not limited thereto, n (n>1) lines in the transverse direction and m (m>1) lines in the longitudinal direction may be arranged. In this case, the value of n and the value of m may be the same as or different from each other. In detail, the number of the mirrors 510 may vary according to the light emitted from the light emitting portion 100 and the number of light emitting devices. Also, the number of the mirrors 510 may vary according to the size of the image sensor 310 of the light receiving portion 300.

The plurality of mirrors 510 may be inclined at a predetermined inclination angle with respect to the light emitting portion 100. The plurality of mirrors 510 may be disposed to have the same inclination angle. For example, the virtual plane extending the upper surfaces of each of the plurality of mirrors 510 may be inclined by an angle defined as a predetermined reference angle θ with respect to the optical axis OA of the light source 110. Here, the upper surface of the mirror 510 may be a reflective surface on which the light emitted from the light source 110 is incident and reflected. That is, each of the plurality of mirrors 510 may be disposed to be inclined by a reference angle θ with respect to the optical axis OA of the light source 110. The reference angle θ may be 90 degrees or less. For example, the reference angle θ may be 45 degrees.

Accordingly, the plurality of mirrors 510 may control the emission direction of the light emitted from the light source 110. In detail, the light passing through the first lens portion 130 may be reflected by the mirror 510 and emitted toward the object. For example, the light incident on the reflective member 500 may be emitted with a path changed by 90 degrees by the plurality of mirrors 510.

Also, the plurality of mirrors 510 may be tilted within a predetermined angle range. For example, each of the plurality of mirrors 510 may be tilted within a predetermined angle range based on the reference angle θ. In this case, the plurality of mirrors 510 may be tilted in a two-dimensional or three-dimensional direction.

In detail, the plurality of mirrors 510 may be provided to be tiltable within a predetermined angle range by a signal applied from the control portion 710. For example, the control portion 710 may tilt the at least one mirror 510 within a predetermined angular range according to a location, a distance, etc. to the object in front of the camera module 1000. Here, the predetermined angle range may be less than about 5 degrees. In detail, the predetermined angle range may be less than about 3 degrees. When the angle range exceeds about 5 degrees, it may be difficult to uniformly irradiate light to an object located at a relatively far distance. Due to this, the accuracy of depth information for a distant object may be lowered. Therefore, the angle range preferably satisfies the above-mentioned range.

Figure 6:
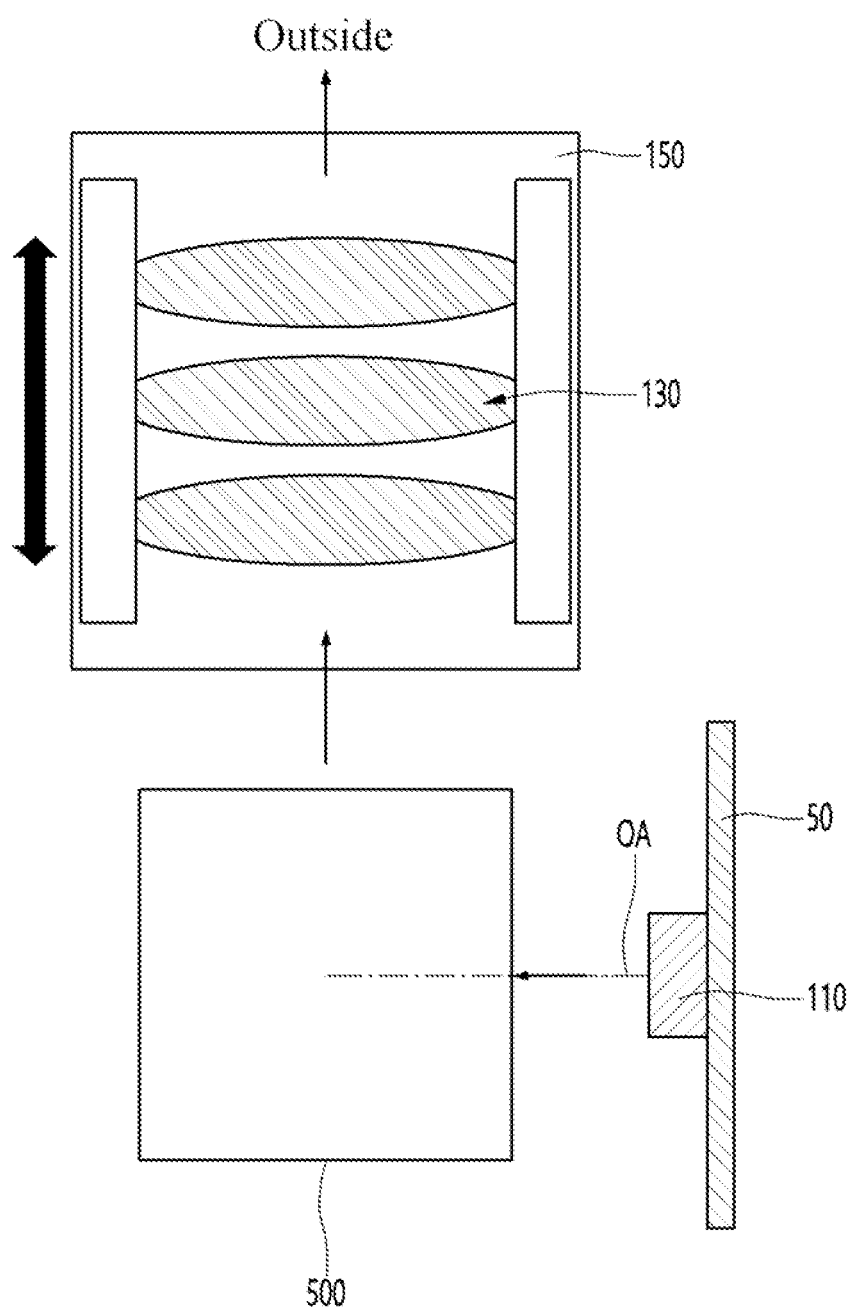
FIG. 6 is another view illustrating an arrangement of a light emitting portion and a reflective member in the camera module according to the embodiment.

FIG. 6 is another view illustrating an arrangement of a light emitting portion and a reflective member in the camera module according to the embodiment. In the description using FIG. 6, descriptions of the same and similar components as those of the camera module described above are omitted, and the same reference numerals are assigned to the same and similar components.

Referring to FIG. 6, the reflective member 500 may be disposed side by side with the light source 110. The reflective member 500 may be disposed between the light source 110 and the first lens portion 130.

The reflective member 500 may include a plurality of mirrors 510. The centers of the plurality of mirrors 510 may overlap the optical axis OA of the light source 110. In addition, the plurality of mirrors 510 may be disposed in a region corresponding to the light emitting device of the light source 110. For example, the plurality of mirrors 510 may be disposed in a region corresponding to the light emitting device disposed in a set pattern. In detail, the plurality of mirrors 510 may be disposed in a region corresponding to the aperture of the light emitting device.

The plurality of mirrors 510 may be disposed to be inclined by a reference angle θ with respect to the optical axis OA of the light source 110. The reference angle θ may be 90 degrees or less. In detail, the reference angle θ may be 45 degrees.

Accordingly, the plurality of mirrors 510 may control the emission direction of the light emitted from the light source 110. For example, the light emitted from the light source 110 and incident on the reflective member 500 may be emitted with a path changed by 90 degrees by the plurality of mirrors 510. The light emitted from the light source 110 may be reflected by the plurality of mirrors 510 and may be incident on the first lens portion 130, and may pass through the first lens portion 130 and be emitted toward the object.

The plurality of mirrors 510 may be tilted in a predetermined angle range based on the reference angle θ. In this case, the plurality of mirrors 510 may be tilted in a two-dimensional or three-dimensional direction. In detail, the plurality of mirrors 510 may be tilted within the predetermined angle range by a signal applied from the control portion 710.

The first lens portion 130 may be disposed on the reflective member 500. The first lens portion 130 may be disposed in a region whose center is perpendicular to the optical axis OA of the light source 110.

The first lens portion 130 may control a path of the light reflected by the reflective member 500. For example, the first lens portion 130 may condense, diffuse, and scatter the light reflected by the reflective member 500.

The first lens portion 130 may transform the light reflected by the reflective member 500 into a set shape. For example, the first lens portion 130 may transform the light reflected by the reflective member 500 into various cross-sectional shapes, such as a circular shape, an elliptical shape, and a polygonal shape. Also, the first lens portion 130 may transform the light reflected by the reflective member 500 into a plurality of point light sources. The first lens portion 130 may transform the light reflected by the reflective member 500 into a shape corresponding to the effective region of the image sensor 310 of the light receiving portion 300.

The driving member 150 may be disposed on the first lens portion 130. The driving member 150 may move the first lens portion 130. The driving member 150 may control a distance between the first lens portion 130 and the reflective member 500. For example, the driving member 150 may move the first lens portion 130 in a direction perpendicular to the optical axis OA of the light source 110. Accordingly, the distance between the first lens portion 130 and the reflective member 500 may increase or decrease. In addition, the distance between the first lens portion 130 and the light source 110 may also increase or decrease.

The driving member 150 may move at least one lens of the first lens portion 130 in a direction perpendicular to the optical axis OA of the light source 110. In this case, the distance between the reflective member 500 and one lens closest to the reflective member 500 may vary. Also, when the first lens portion 130 includes a plurality of lenses, the distance between the one lens and the other lens may also change.

The driving member 150 may control the position of the first lens portion 130. In detail, the driving member 150 controls the distance between the first lens portion 130 and the reflective member 500 so that the light emitted from the camera module 1000 may form a surface light source or a point light source.

Figure 7:
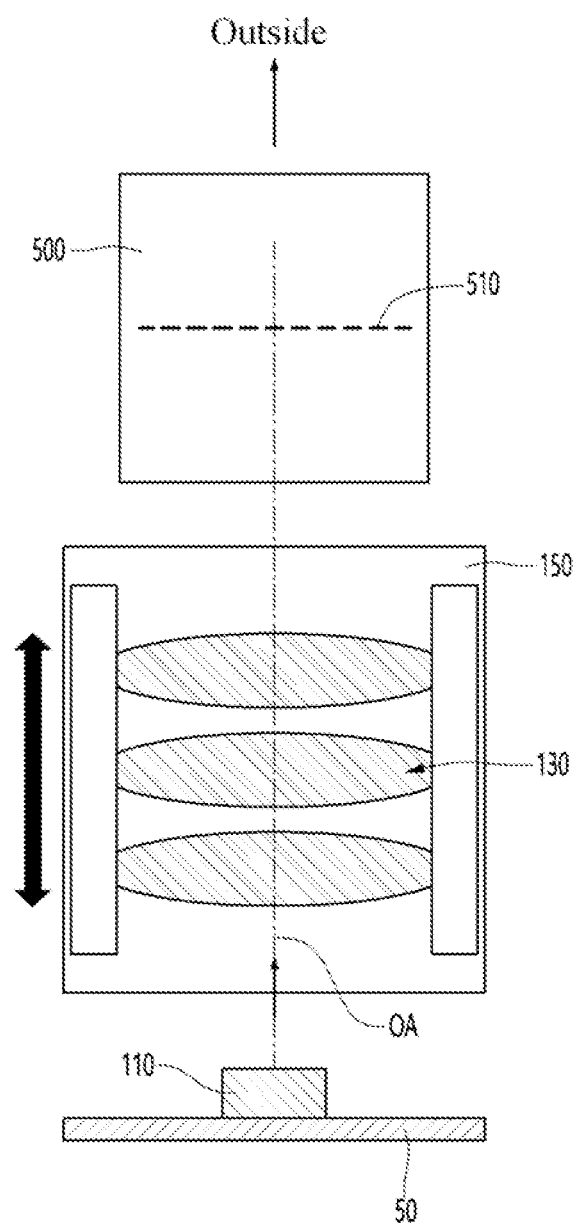
FIGS. 7 and 8 are other views illustrating the arrangement of the light emitting portion and the reflective member in the camera module according to the embodiment.
Figure 8:
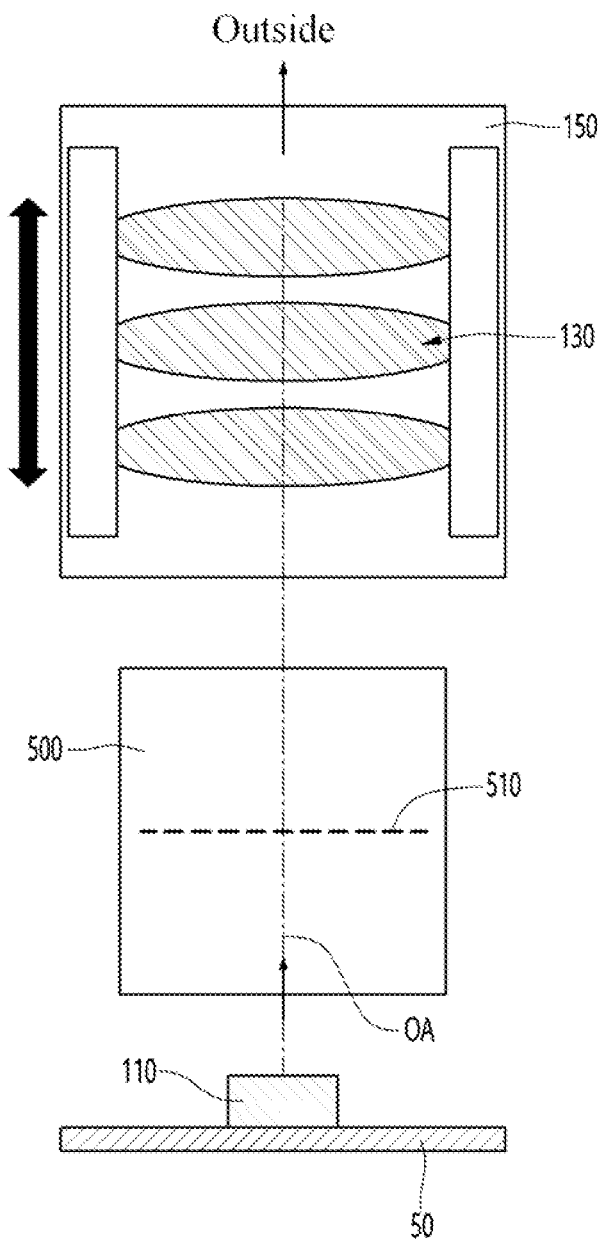

FIGS. 7 and 8 are other views illustrating the arrangement of the light emitting portion and the reflective member in the camera module according to the embodiment. In the description using FIGS. 7 and 8, descriptions of the same and similar components as those of the camera module described above are omitted, and the same reference numerals are assigned to the same and similar components.

Referring to FIGS. 7 and 8, the reflective member 500 may be disposed on the first lens portion 130 as shown in FIG. 7 or the reflective member 500 may be disposed between the light source 110 and the first lens portion 130 as shown in FIG. 8.

The reflective member 500 may include a plurality of mirrors 510. The centers of the plurality of mirrors 510 may overlap the optical axis OA of the light source 110. In addition, the plurality of mirrors 510 may be disposed in a region corresponding to the light emitting device of the light source 110. For example, the plurality of mirrors 510 may be disposed in a region corresponding to the light emitting device disposed in a set pattern. In detail, the plurality of mirrors 510 may be disposed in a region corresponding to the aperture of the light emitting device.

The plurality of mirrors 510 may be disposed to be inclined by a reference angle θ with respect to the optical axis OA of the light source 110. The reference angle θ may be 90 degrees or less. In detail, the reference angle θ may be 90 degrees. That is, a virtual plane extending from the top surfaces of each of the plurality of mirrors 510 may be perpendicular to the optical axis OA of the light source 110.

The plurality of mirrors 510 may transmit or semi-transmit the light emitted from the light source 110. Accordingly, the plurality of mirrors 510 may control the emission direction of the light emitted from the light source 110. For example, in the case of FIG. 7, the light emitted from the light source 110 may pass through the first lens portion 130, and the light passing through the first lens portion 130 may pass through the plurality of mirrors 510 and may be emitted toward the object. In addition, in the case of FIG. 8, the light emitted from the light source 110 may pass through the plurality of mirrors 510, and the light passing through the plurality of mirrors 510 may pass through the first lens portion 130 and be emitted toward the object.

The plurality of mirrors 510 may be tilted in a predetermined angle range based on the reference angle θ. In this case, the plurality of mirrors 510 may be tilted in a two-dimensional or three-dimensional direction. In detail, the plurality of mirrors 510 may be tilted within the predetermined angle range by a signal applied from the control portion 710.

Figure 9:
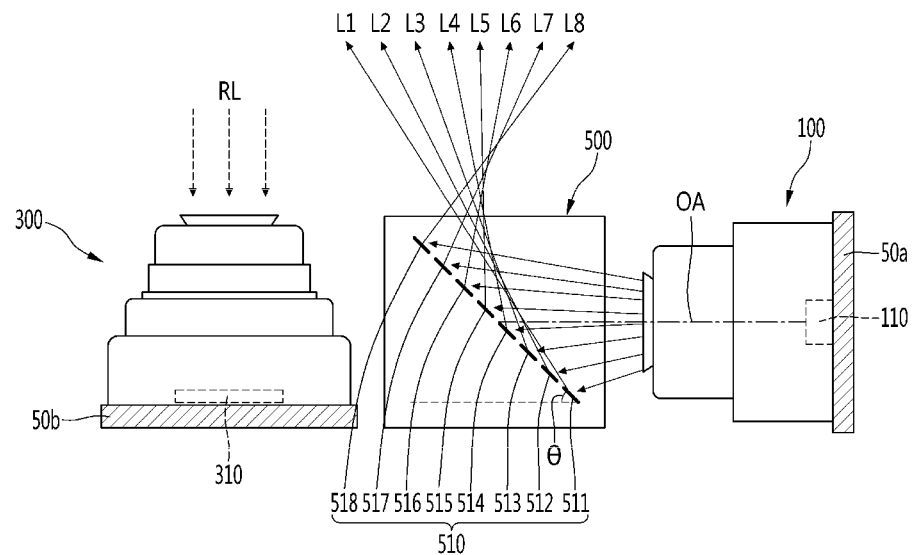
FIGS. 9 to 11 are views for explaining the tilt of the reflective member according to the presence or absence of an object.
Figure 10:
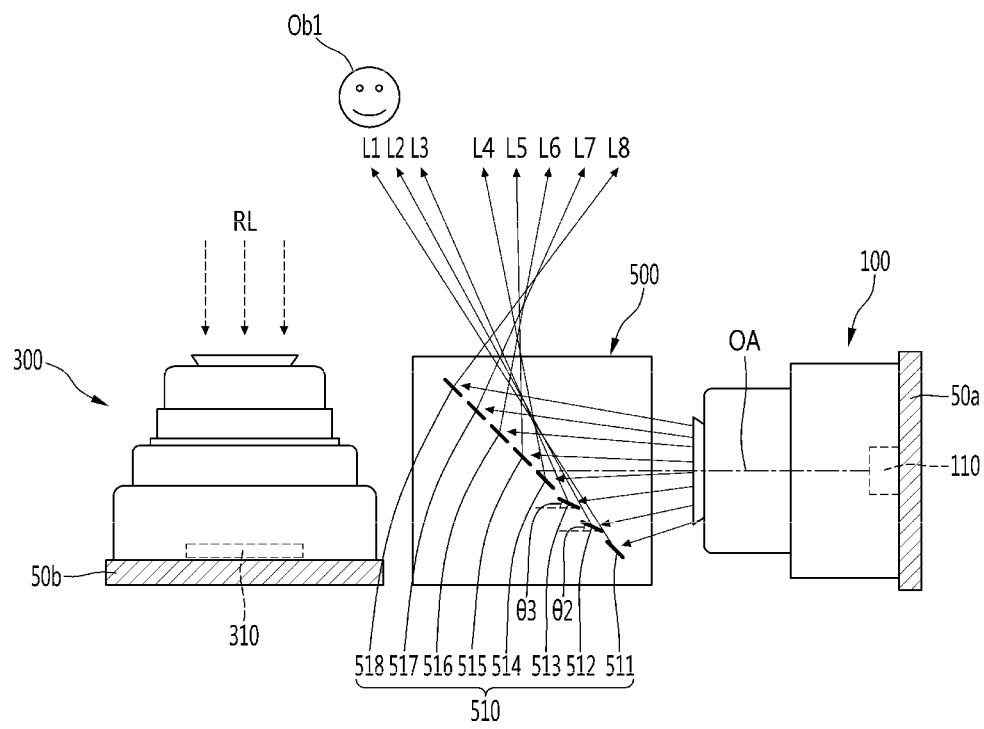
Figure 11:
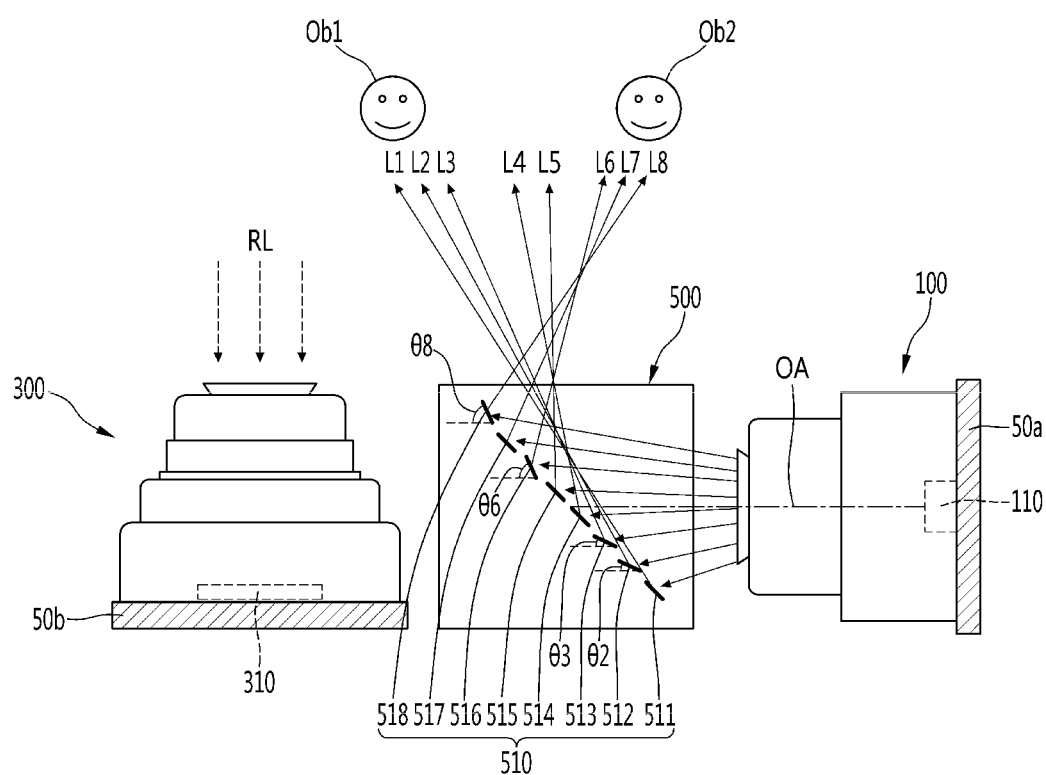
Figure 12:
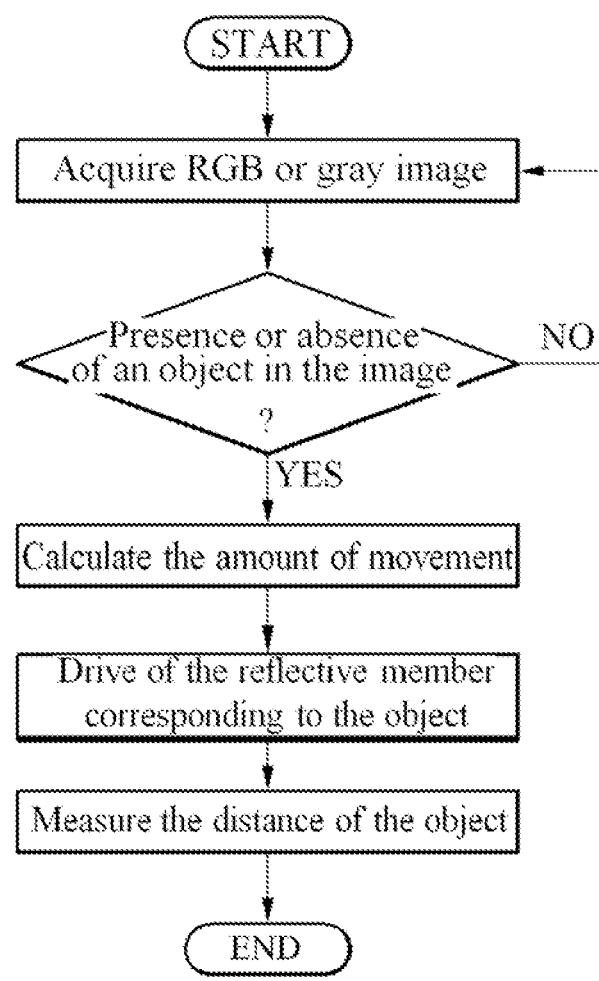
FIG. 12 is a diagram illustrating a method of operating a camera module according to an embodiment.

FIGS. 9 to 11 are views for explaining a tilt of a reflective member according to the presence or absence of an object, and FIG. 12 is a view for an operating method of a camera module according to an embodiment.

Referring to FIGS. 9 and 10, power may be applied to the camera module 1000. Accordingly, the light emitting portion 100 of the camera module 1000 may emit light toward the front, and the light receiving portion 300 may detect the light reflected from the object and incident on the light receiving portion 300. In this process, the camera module 1000 may obtain an RGB image or a gray image.

In detail, the light emitted from the light source 110 may pass through the first lens portion 130 and be incident on the reflective member 500. Thereafter, the light incident on the reflective member 500 may be reflected by the plurality of mirrors 510 and emitted toward the front of the camera module 1000.

For example, the plurality of mirrors 510 may include first to eighth mirrors 511, 512, 513, 514, 515, 516, 517 and 518 inclined by a reference angle θ with respect to the optical axis OA of the light source 110.

In this case, the light emitted from the light source 110 includes the first light L1 reflected by the first mirror 511, the second light L2 reflected by the second mirror 512, and the third light L1. The third light L3 reflected by the mirror 513 and the fourth light L4 reflected by the fourth mirror 514 may be included. In addition, the light emitted from the light source 110 may include a fifth light L5 reflected by the fifth mirror 515, a sixth light L6 reflected by the sixth mirror 516, and the seventh light L7 reflected by the seventh mirror 517, and the eighth light L8 reflected by the eighth mirror 518.

The first to eighth lights L1 to L8 may be emitted toward a target disposed in front of the camera module 1000. The first to eighth lights L1 to L8 may be emitted in a set direction and region. The first to eighth lights L1 to L8 may be emitted as a surface light source or a point light source by the first lens portion 130 and the driving member 150. Subsequently, the first to eighth lights L1 to L8 may be reflected on the target, and the reflected light RL may be incident on the light receiving portion 300.

The camera module 1000 may determine the presence or absence of an object in the acquired image, and may select the object. The control portion 710 may select an object when there is an object in the image. Also, the user may select an object from the acquired image.

In detail, when the first object Ob1 is positioned in front of the camera module 1000 as shown in FIG. 8, the control portion 710 or the user may select the first object Ob1.

Thereafter, the control portion 710 may calculate the movement amount. In detail, the control portion 710 may calculate the amount of movement of the reflective member 500 with respect to the first object Ob1. In more detail, the control portion 710 controls at least one mirror 510 corresponding to the first object Ob1 among the plurality of mirrors 510 and at least one mirror 510 among the mirrors 510 around the first object Ob1 can calculate the amount of movement, for example, the degree of tilt.

For example, the first object Ob1 may be located in a region corresponding to at least one of the plurality of mirrors 510. In detail, the first object Ob1 may be located in a region corresponding to the first mirror 511 as shown in FIG. 8. Accordingly, the first light L1 of the first mirror 511 may be incident on the first object Ob1.

In this case, the control portion 710 may control the mirror 510 irradiating light to the first object Ob1 and at least one mirror 510 irradiating light to the peripheral portion of the first object Ob1. For example, the control portion 710 may control the first mirror 511 that forms the first light L1. The first mirror 511 may be tilted within a predetermined angle range from the reference angle θ by the control portion 710. Accordingly, the first mirror 511 may provide more light to the first object Ob1.

Also, the control portion 710 may control the second mirror 512 and the third mirror 513 that form the second light L2 and the third light L3. In detail, the first mirror 511 may be tilted within a predetermined angle range from the reference angle θ by the control portion 710. In addition, the second mirror 512 and the third mirror 513 may be tilted within a predetermined angle range from the reference angle θ by the control portion 710. For example, the second mirror 512 may be tilted by a second angle θ2 from the reference angle θ, and the third mirror 513 may be tilted by a third angle θ3 from the reference angle θ. The second angle θ2 and the third angle θ3 satisfy the above-described predetermined angle range and may be less than about 5 degrees. In addition, the remaining mirrors, for example, the fourth to eighth mirrors 514, 515, 516, 517, and 518 may be disposed without being tilted while maintaining the reference angle θ.

Accordingly, the camera module 1000 may direct the light irradiated to the peripheral portion of the first object Ob1 toward the first object Ob1. Accordingly, more light may be irradiated to the first object Ob1, and more reflected light RL reflected by the first object Ob1 may be incident on the image sensor 310 of the light receiving portion 300.

Therefore, the camera module 1000 may have a more accurate focus on the first object Ob1. In addition, the camera module 1000 may effectively measure the distance to the first object Ob1 and obtain improved depth information on the first object Ob1. When the acquisition of the depth information on the first object Ob1 is finished, the second and third mirrors 512 and 513 may return to the reference angle θ without being tilted and may be maintained.

In particular, in the camera module 1000 according to the embodiment, when the first object Ob1 is located at a relatively long distance, the intensity of light reaching the first object Ob1 may be relatively small. However, the camera module 1000 according to the embodiment may focus the light on the first object Ob1 by tilting the at least one mirror 510. Accordingly, even when the first object Ob1 is located at a long distance, depth information with improved accuracy may be obtained.

Also, the camera module 1000 may track the first object Ob1. For example, when the position of the first object Ob1 is changed, the mirror 510 corresponding to the first object Ob1 and the mirror 510 corresponding to the periphery portion of the first object Ob1 may be controlled Accordingly, the camera module 1000 may acquire depth information in real time while more accurately focusing on an object whose position changes.

In addition, in the camera module 1000, the optical axis of the light emitting portion 100 and the optical axis of the light receiving portion 300 may be disposed perpendicular to each other. That is, the light emitting portion 100 may have a shape extending in the transverse direction, thereby reducing the overall thickness of the camera module 1000.

Referring to FIG. 11, a plurality of objects may be positioned in front of the camera module 1000. For example, a first object Ob1 and a second object Ob2 spaced apart from the first object Ob1 may be positioned on the front of the camera module 1000.

In this case, the control portion 710 or the user may select at least one of the first object Ob1 and the second object Ob2.

Thereafter, the control portion 710 may calculate the movement amount. In detail, when the control portion 710 or the user selects both the first object Ob1 and the second object Ob2, the control portion 710 may calculate a movement amount of at least one mirror 510 corresponding to the first object Ob1 and the second object Ob2. Also, the control portion 710 may calculate a movement amount of at least one mirror 510 corresponding to peripheral portions of the first object Ob1 and the second object Ob2.

For example, the first object Ob1 may be located in a region corresponding to the first mirror 511, and the first object Ob1 may be incident the first light L1 of the first mirror 511. In this case, the control portion 710 may control the first mirror 511 irradiating light to the first object Ob1. Also, the control portion 710 may control the second mirror 512 and the third mirror 513 for irradiating light to the peripheral portion of the first object Ob1.

In detail, the first mirror 511 may be tilted within a predetermined angle range from the reference angle θ by the control portion 710. In addition, the second mirror 512 and the third mirror 513 may be tilted within a predetermined angle range from the reference angle θ by the control portion 710. For example, the second mirror 512 may be tilted by a second angle θ2 from the reference angle θ, and the third mirror 513 may be tilted by a third angle θ3 from the reference angle θ.

In addition, the second object Ob2 may be located in a region corresponding to the seventh mirror 517, and the seventh light L7 of the seventh mirror 517 may incident to the second object Ob2. In this case, the control portion 710 may control the seventh mirror 517 irradiating light to the second object Ob2. Also, the control portion 710 may control a sixth mirror 516 and an eighth mirror 518 that irradiate light to the peripheral portion of the second object Ob2.

In detail, the seventh mirror 517 may be tilted within a predetermined angle range from the reference angle θ by the control portion 710. In addition, the sixth mirror 516 and the eighth mirror 518 may be tilted within a predetermined angle range from the reference angle θ by the control portion 710. For example, the sixth mirror 516 may be tilted by a sixth angle θ6 from the reference angle θ, and the eighth mirror 518 may be tilted by an eighth angle θ8 from the reference angle θ.

The tilt angle of the first mirror 511, the tilt angle of the seventh mirror 517, the second angle θ2, the third angle θ3, the sixth angle θ6, and the eighth angle θ8 satisfies the above-described predetermined angle range and may be less than about 5 degrees.

Accordingly, the camera module 1000 may direct the light irradiated to the periphery portion of each of the first and second objects Ob1 and Ob2 toward the first and second objects Ob1 and Ob2. Accordingly, more light may be irradiated to the first and second objects Ob1 and Ob2, and the reflected light RL reflected from the first and second objects Ob1 and Ob2 respectively to the image sensor 310 may be more incident. Therefore, the camera module 1000 may simultaneously focus on a plurality of objects. In addition, the camera module 1000 may effectively measure the respective distances to the first and second objects Ob1 and Ob2, and may acquire depth information with improved accuracy.

In particular, the first object Ob1 and the second object Ob2 may be located at different positions. For example, the first object Ob1 may be located at a greater distance from the camera module 1000 than the second object Ob2. Even in this case, the camera module 1000 according to the embodiment controls the mirror 510 corresponding to each of the first and second objects Ob1 and Ob2 and the mirror 510 of the its periphery portion and may simultaneously obtain different depth information of the plurality of objects Ob1 and Ob2.

Also, the first object Ob1 and the second object Ob2 may move in the same direction or in different directions. In this case, the camera module 1000 may control the mirror 510 corresponding to each of the objects Ob1 and Ob2 and the mirror 510 of its periphery portion to accurately maintain the focus on the plurality of objects Ob1 and Ob2. Accordingly, the camera module 1000 may obtain the depth information about a plurality of objects whose positions change in real time, and may improve the accuracy of the depth information.

Figure 13:
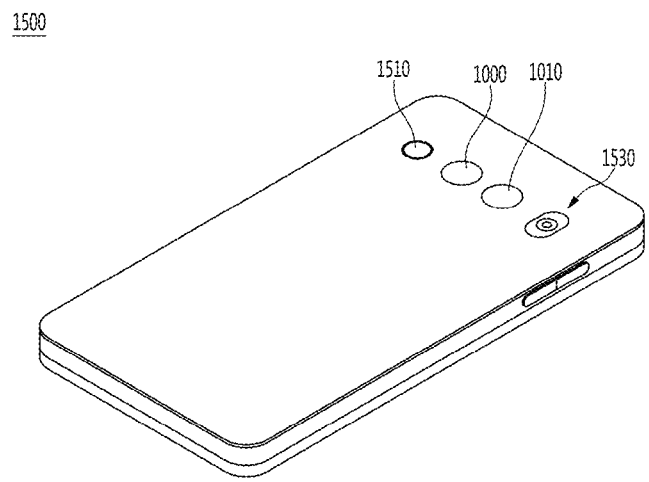
FIGS. 13 and 14 are perspective views of a mobile terminal and a vehicle to which a camera module according to an embodiment is applied.
Figure 14:
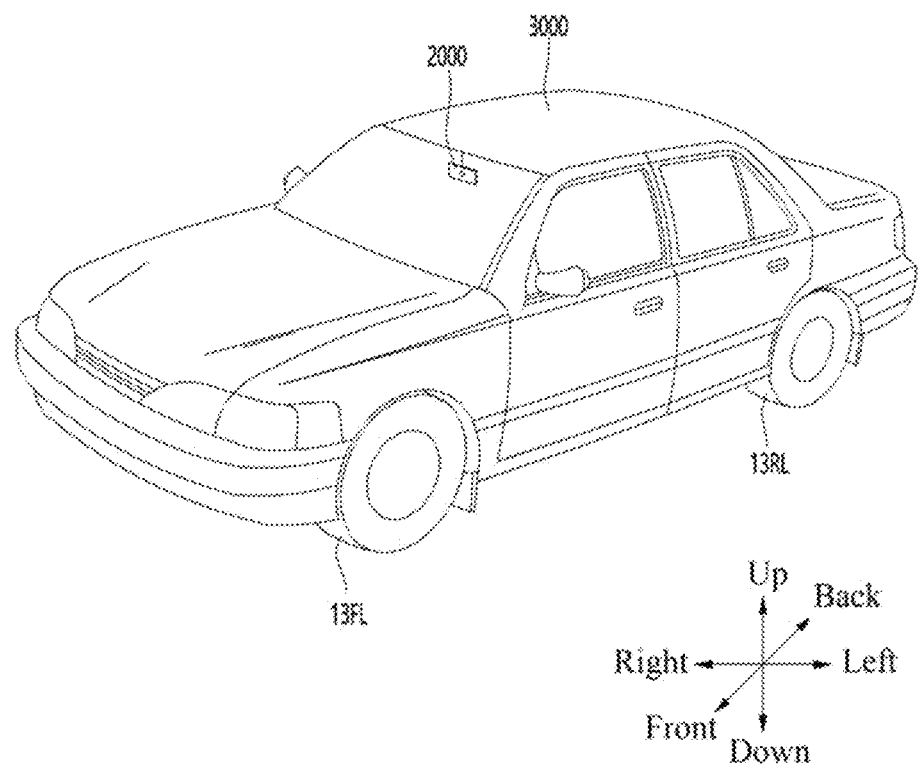

Referring to FIGS. 13 and 14, the camera module according to the embodiment may be applied to an optical device.

First, referring to FIG. 13, the camera module 1000 according to the embodiment may be applied to the mobile terminal 1500. A first camera module 1000 and a second camera module 1010 may be disposed on the rear side of the mobile terminal 1500 according to the embodiment.

The first camera module 1000 is the aforementioned camera module 1000 and may include a light emitting portion 100 and a light receiving portion 300. The camera module 1000 may be a time of flight (TOF) camera.

The second camera module 1010 may include an image capturing function. Also, the second camera module 1000 may include at least one of an auto focus function, a zoom function, and an OIS function. The second camera module 1010 may process an image frame of a still image or a moving image obtained by an image sensor in a shooting mode or a video call mode. The processed image frame may be displayed on a predetermined display unit and stored in a memory. In addition, although not shown in the drawings, a camera may be disposed on the front of the mobile terminal 1500.

A flash module 1530 may be disposed on the rear surface of the mobile terminal 1500. The flash module 1530 may include a light emitting device that emits light therein. The flash module 1530 may be operated by a camera operation of a mobile terminal or a user's control.

Accordingly, the user may photograph and display the object using the mobile terminal 1500. In addition, the user can effectively grasp the depth information of the object by using the first camera module 1000.

Also, referring to FIG. 14, the camera module 1000 according to the embodiment may be applied to a vehicle 3000.

The vehicle 3000 according to the embodiment may include wheels 13FL and 13FR that rotate by a power source and a predetermined sensor. The sensor may include a camera sensor 2000, and the camera sensor 2000 may be a camera sensor including the above-described camera module 1000.

The vehicle 3000 according to the embodiment may acquire image information and depth information through a camera sensor 2000 that captures a front image or a surrounding image, and determines a lane unidentified situation by using the image and depth information, and may generate a virtual lane when the lane is not identified.

For example, the camera sensor 2000 may acquire a front image by photographing the front of the vehicle 3000, and a processor (not shown) may obtain image information by analyzing an object included in the front image.

For example, when an object such as a median, curb, or street tree corresponding to lanes, adjacent vehicles, driving obstructions, and indirect road markings is captured in the image captured by the camera sensor 2000, the processor may detect depth information as well as image information of these objects. That is, the embodiment may provide more specific and accurate information about the object to the occupant of the vehicle 3000.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention.

In addition, although the embodiment has been described above, it is merely an example and does not limit the invention, and those of ordinary skill in the art to which the invention pertains are exemplified above in a range that does not depart from the essential characteristics of the present embodiment. It can be seen that various modifications and applications that have not been made are possible. For example, each component specifically shown in the embodiment can be implemented by modification. And differences related to such modifications and applications should be construed as being included in the scope of the invention defined in the appended claims.

The invention claimed is:

1. A camera module comprising:
a light emitting portion irradiating light toward an object, wherein the light emitting portion comprises:
   a light source having a plurality of light emitting devices and emitting light;
   a first lens portion disposed on the light source;
   a reflective member reflecting light emitted from the light source; and
   a driving member for moving the first lens portion,
wherein the driving member adjusts a distance between the light source and the first lens portion,
wherein the reflective member includes a plurality of mirrors spaced apart from each other, and
wherein the plurality of mirrors includes a plurality of first mirrors that are tilted within a predetermined angle range from a reference angle to control an emission direction of the light.

2. The camera module of claim 1, wherein the plurality of first mirrors includes a second mirror reflecting light toward the object and a third mirror reflecting light to a periphery portion of the object, and
wherein at least one of the second mirror and the third mirror is tilted within the predetermined angle range from the reference angle.

3. The camera module of claim 2, wherein the plurality of mirror includes a fourth mirror that does not correspond to the object, and
wherein the fourth mirror maintains the reference angle without being tilted.

4. The camera module of claim 1, wherein the plurality of mirrors includes at least one of a reflective MEMS (Microelectric mechanical system) mirror, a transmissive MEMS mirror, a reflective DMD (Digital Micromirror Device) device, and a transmissive DMD device.

5. The camera module of claim 1, wherein the plurality of mirrors is inclined at the reference angle with respect to an optical axis of the light source, and
wherein the reference angle is 45 degrees.

6. The camera module of claim 1, wherein the light source comprises a vertical cavity surface emitting laser,
wherein the vertical cavity surface emitting laser comprises a plurality of apertures, and
wherein the plurality of mirrors is provided with a number equal to or greater than a number of the plurality of apertures.

7. The camera module of claim 1, wherein the first lens portion moves along an optical axis of the light source by the driving member.

8. The camera module of claim 7, wherein the driving member adjusts a light pattern irradiated to the object as a surface light source or a point light source.

9. The camera module of claim 1, wherein the first lens portion is moved in a direction perpendicular to an optical axis of the light source by the driving member.

10. The camera module of claim 1, comprising:
a light receiving portion including an image sensor,
wherein the light receiving portion includes a second lens portion disposed on the image sensor.

11. A camera module comprising:
a light emitting portion irradiating light toward an object, the light emitting portion including a light source and a first lens portion disposed on the light source; and
a light receiving portion including an image sensor and a second lens portion on the image sensor,
wherein the light emitting portion comprises a reflective member disposed between the light source and the object and reflecting light emitted from the light source,
wherein the light source comprises a vertical cavity surface emitting laser,
wherein the vertical cavity surface emitting laser comprises a plurality of apertures,
wherein the reflective member includes a plurality of mirrors,
wherein the plurality of mirrors is greater than or equal to a number of the plurality of apertures, and
wherein the plurality of mirrors includes a plurality of first mirror that are tilted within a predetermined angle range from a reference angle to control an emission direction the light.

12. The camera module of claim 11, wherein the plurality of first mirrors includes a second mirror that reflects light toward the object and a third mirror that reflects light toward a periphery portion of the object.

13. The camera module of claim 12, wherein the plurality of mirrors includes a fourth mirror maintaining the reference angle.

14. The camera module of claim 11, wherein the plurality of mirrors includes at least one of a reflective MEMS (Micro-electric mechanical system) mirror, a transmissive MEMS mirror, a reflective DMD (Digital Micromirror Device) device, and a transmissive DMD device.

15. The camera module of claim 11, wherein the reference angle is 45 degrees with respect to an optical axis of the light source.

16. The camera module of claim 11, wherein a tilt angle of the plurality of first mirrors is controlled according to a size or position of the object.

17. The camera module of claim 11, wherein a tilt angle of the plurality of first mirrors is controlled according to a distance between the camera module and the object.

18. The camera module of claim 11, comprising a driving member for adjusting a distance between the first lens portion and the light source.

19. The camera module of claim 11, wherein the plurality of first mirrors is spaced from each other in transverse and longitudinal directions.

20. The camera module of claim 11, wherein the plurality of mirrors is tilted at different angles to reflect light toward each of different objects spaced apart from each other or a periphery portion of the different objects.

* * * * *